July 8, 1930.  G. F. WELLS  1,769,973
ELECTRIC TOASTER
Filed April 30, 1928   3 Sheets-Sheet 1
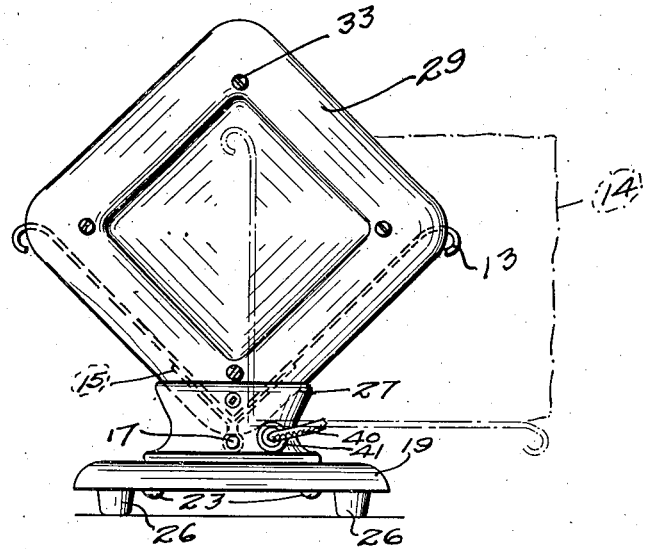
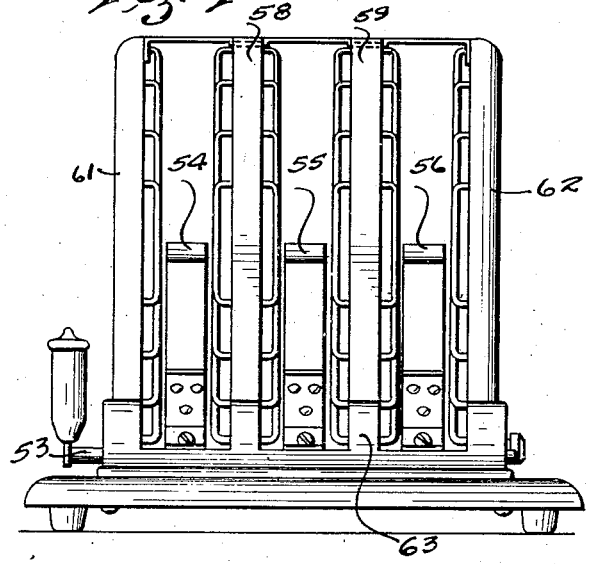
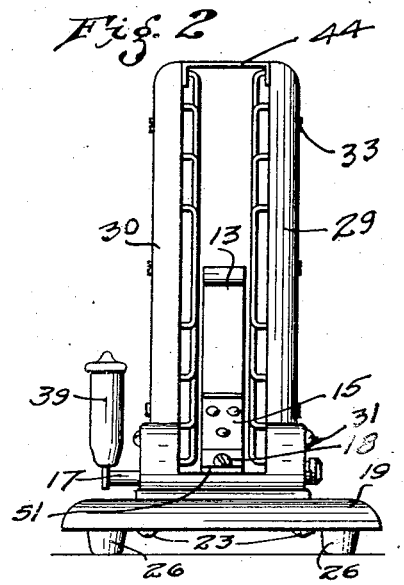
INVENTOR
George F. Wells
By John Flann
ATTORNEY July 8, 1930.   G. F. WELLS   1,769,973
ELECTRIC TOASTER
Filed April 30, 1928   3 Sheets-Sheet 2

INVENTOR
George F. Wells
By John Flam
ATTORNEY

July 8, 1930.  G. F. WELLS  1,769,973
ELECTRIC TOASTER
Filed April 30, 1928   3 Sheets-Sheet 3
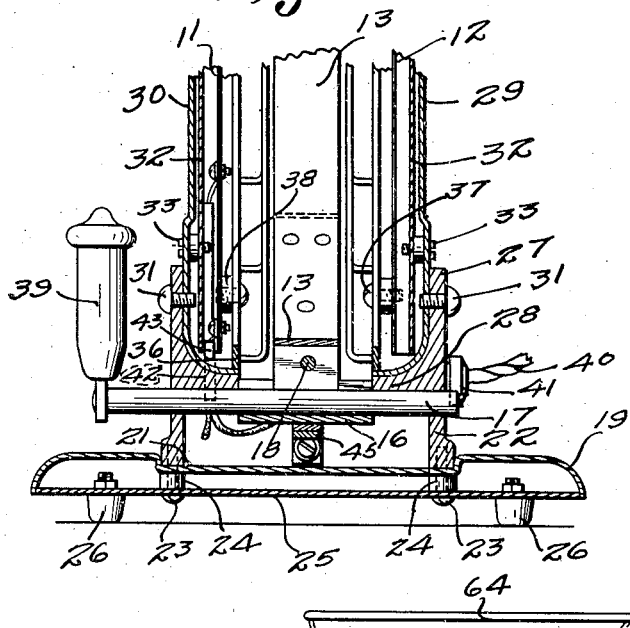
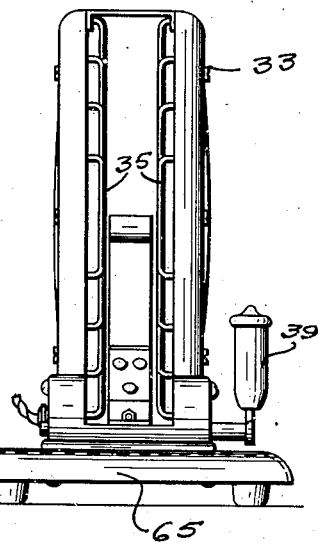
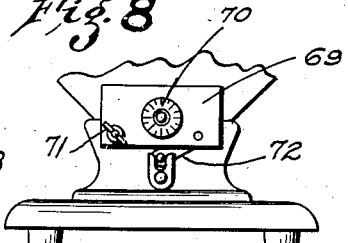
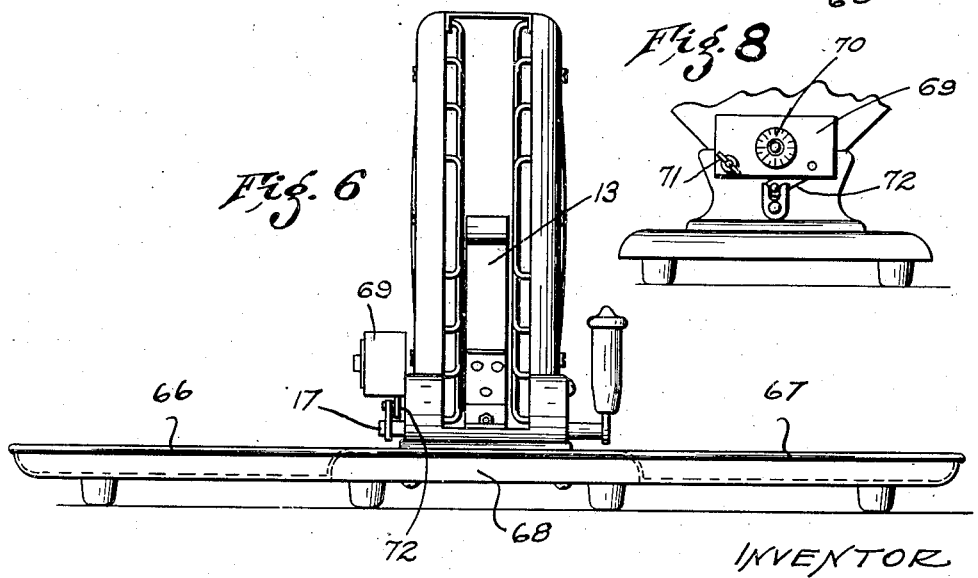
INVENTOR
George F. Wells
By John Flam
ATTORNEY Patented July 8, 1930

1,769,973

UNITED STATES PATENT OFFICE

GEORGE F. WELLS, OF SAN FRANCISCO, CALIFORNIA

ELECTRIC TOASTER

Application filed April 30, 1928. Serial No. 273,932.

This invention relates to an electrical appliance, and particularly to a bread toaster.

It is one of the objects of my invention to provide an electric toaster that is simple in construction and that is easy to manipulate.

It is another object of my invention to provide a novel form of bread support by the aid of which the bread can be removed from the toaster by rotating it outwardly from between the heating elements.

My invention possesses many other advantages, and has other objects which may be made more easily apparent from a consideration of several embodiments of my invention. For this purpose I have shown a few forms in the drawings accompanying and forming part of the present specification. I shall now proceed to describe these forms in detail, which illustrate the general principles of my invention; but it is to be understood that this detailed description is not to be taken in a limiting sense, since the scope of my invention is best defined by the appended claims.

Referring to the drawings:

Figure 1 is a side elevation of one form of my toaster;

Fig. 2 is a front elevation thereof, partly in section;

Figures 3, 3A:
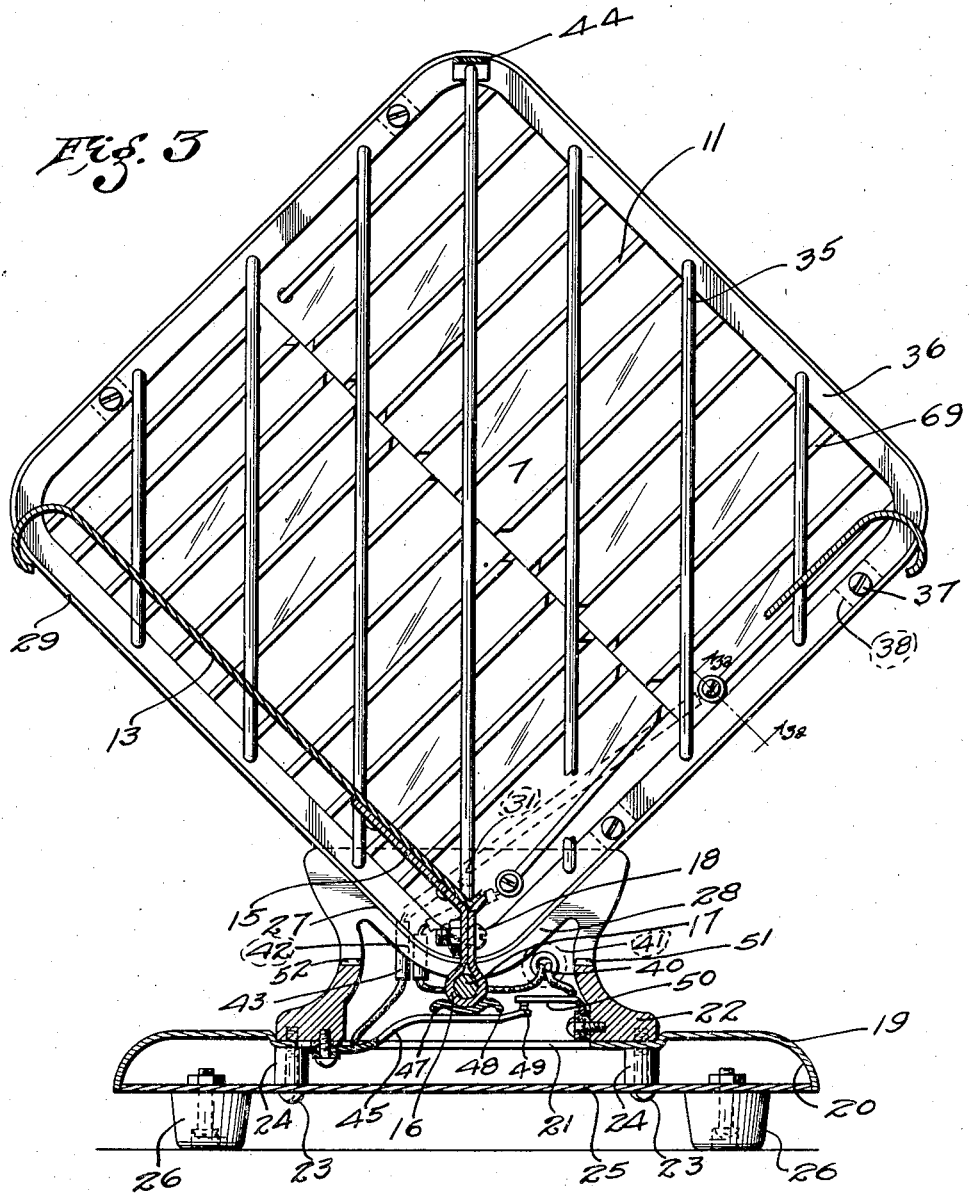
Fig. 3 is an enlarged section taken through the center of the toaster.

Fig. 3ª is an enlarged fragmentary section, taken along plane 3ª—3ª of Fig. 3;

Fig. 4 is a fragmentary longitudinal section of the toaster, the plane of the section being at right angles to that of Fig. 3;

Figs. 5 and 6 are front elevations of two modifications of the toaster shown in Figs. 1 to 4;

Fig. 7 is a front elevation of a multiple slice toaster embodying the principles of my invention; and Fig. 8 is a fragmentary side elevation of Fig. 6.

In general, I utilize one or more pairs of heating elements, such as 11 and 12, Figs. 3 and 4, between which slices of bread can be accommodated, for toasting both sides of the bread at once. These elements can be in the form of a resistance conductor 69 wound on insulation plates 7, such as mica. The bread can be accommodated on a rack 13. Since the elements 11 and 12 are vertically arranged, I make rack 13 so that the bread it carries can be interleaved with the elements. In the present instance, this interleaving is accomplished in a novel and simple manner.

Thus rack 13 includes a pair of arms spaced substantially at right angles to one another, the apex being adjacent the lower ends of elements 11 and 12, and the entire rack being disposed, when in active position, between the elements. The bread 14 (Fig. 1) can be placed on the rack so as to be confined by these two sides. The rack 13 can be tilted so that it can assume the alternate position shown in Fig. 1, or the position shown in Fig. 3. To perform this tilting, rack 13 at its apex is provided with a corner reinforcement member 15 of sheet metal. This member 15 has an ear 16 formed by doubling the material, said ear extending around a shaft 17 that extends through supports hereinafter to be described. Ear 16 is fastened on shaft 17 as by screw 18. It is thus seen that the bread 14 can be easily moved, by a simple rotation of shaft 17, either to a position between the elements 11 and 12, or to a position where it can be taken off or put on rack 13.

I shall now describe the various supporting elements of the toaster, whereby the functions as heretofore set forth, can be readily accomplished.

A sheet metal base member 19 is provided, having rounded or cupped edges, as shown at 20 (Fig. 3). This base has a central apertured depression 21 for the accommodation of a support or standard 22. This standard fits into the depression and is held thereon by the aid of a plurality of screws 23. Spacers 24 are disposed over these screws, between the bottom of depression 21 and a cover plate 25 for the bottom of base 19. Insulation feet 26 fastened to plate 25 serve to space the base 19 from a supporting surface.

The standard 22 serves to provide a journal bearing for shaft 17, and also to support the elements 11 and 12. For this purpose, standard 22 has at each side, a saddle 27 defined by a web 28 (Fig. 3) upon which the heating structure is supported. As shown most clearly in Figs. 3 and 4, the web 28 is formed integrally with the outer wall of saddle 27, and forms therewith a triangular pocket. In each of these triangular pockets there is a substantially square shaped shield 29, or 30, fastened therein as by screws 31. These shields 29, 30 are conveniently made from the same die as used for making base 19, the contour of each being exactly the same. However, shields 29, 30 do not have any central apertures.

Fastening into each of these shields 29, 30 is a sheet metal member 32 held in place as by screws 33. Spaced over this member, as by the aid of the opposite raised sides 34 (Fig. 3ᵃ) of the member 32, is the heating unit 11 or 12. These heating units are held in place by the aid of a grill structure 35, comprising a series of bars fastened as by welding, to a frame 36. The grill structures at the edges are close to the edges of shields 29, 30. They are held in place on sides 34 by screws 37; and spacers 38 can be interposed between the frames 36 and the heating elements 11, 12.

The manipulation of shaft 17 is rendered simple by the addition of a handle 39 fastened to one end thereof. The shaft 17 is furthermore prevented from axial movement with respect to support 22, as by making the axial length of ear 16 so large as to extend all the way between the two socket members 27, thereby forming shoulders cooperating with the inner surfaces of these members, see Fig. 4.

Connections to the heating elements can be provided by leading wires 40 through a bushing 41 located in an aperture beneath one of the vanes 28. Thence the wires can extend through apertures 42 in the vanes 28, in which apertures insulation bushings 43 can be provided. These bushings lead through shields 29, 30 and thereby provide conduits through which connections to the heating units 11 and 12 can be made.

In order to provide a brace for the two heating unit structures at the top, I provide a member 44 adjacent the upper corner, which is fastened to the grill structures 35.

It is advisable to ensure that the bread support 13 be normally in the position shown in Fig. 3. For this purpose, I provide a flat spring 45, fastened to the bottom edge of support 22 and engaged by either projections 47 or 48 on ear 16 when shaft 17 is rotated out of the central position. The resilience of this spring serves to urge the support 13 to the position of Fig. 3. In fact, the rotation of shaft 17 to the alternate position shown in Fig. 1, can be used to perform a switching operation, whereby the elements 11, 12 are deenergized. For this purpose, the spring 45 can carry an insulated contact 49 cooperating with another insulated contact 50. These contacts are opened when the shaft 17 is rotated out of central position, because either one or the other of ears 47, 48 will engage spring 45 and urge it away from contact 50. Thus the heating element circuit can be automatically opened and kept open while the toaster is being loaded or unloaded.

In order to limit the movement of the bread support 13, I provide a stop for it on each side of the supporting member 22. These stops are in the form of bosses 51, 52.

The toaster just described can toast one piece of bread on both sides at once. However, by multiplying the number of heating elements and grills, it is possible to provide an arrangement for toasting a plurality of slices at once. Such a form is shown in Fig. 7, in which three slices can be toasted. A common shaft 53 controls all of the bread supports 54, 55, 56. The intermediate heating elements 58, 59, are active on both sides, while the end elements are provided with the shields 61, 62. The intermediate elements can be supported on the supporting member 63 in any appropriate manner.

In Fig. 5, I show a toaster that is provided at one side with a tray 64, shown as forming a continuation of base 65 on which the toaster is supported. This tray can serve to hold slices of bread waiting to be toasted.

In Figs 6 and 8 a further modification is shown, there being in this instance a pair of trays 66, 67, one on each side of the base 68. These trays can be used, one for the bread to be toasted, and the other for the toasted slices. In other respects, the forms shown in Figs. 5 and 6 can be substantially like that heretofore described.

In this case I also show a timing device for tilting the bread rack 13 after a predetermined time has elapsed, whereby the circuits are also automatically opened, as described in connection with Fig. 3. This timing device can include a constant speed device 69, such as an escapement controlled spring movement. A dial 70 can be set for determining the duration of the toasting operation, and means for winding up the motor 69 can be provided by a thumb nut 71. This device 69 is arranged to actuate a lever 72 or other mechanism that is in mechanical engagement with the shaft 17; for example, by a slot and pin connection. Lever 72 can be operated in a manner analogous to the alarm mechanism of an alarm clock, and when it is actuated by the mechanism, it tilts shaft 17 to discharge the bread. The tilting motion can be damped if desired in any appropriate manner.

I claim:

1. In a toaster, a pair of opposed heating elements, said elements being substantially square, means for supporting said elements so that the diagonal of the square is substantially vertical, and a bread rack rotatably supported between the elements.

2. In an electric toaster, a standard providing a pair of saddle supports, square heating units each supported at one corner respectively on the supports so as to form a narrow space between them, and a rack movable in and out of said space.

3. In an electric toaster, a standard providing a pair of saddle supports, square heating units each supported at one corner respectively on the supports so as to form a narrow space between them, a rack, and a shaft supporting said rack rotatably, whereby it can be rotated in and out of said space.

4. In a toaster, a pair of opposed heating elements, said elements being substantially square, means for supporting said elements so that the diagonal of the square is substantially vertical, and a bread rack formed of two sides forming an angle, supported between the elements, the rack being rotatable adjacent the lower corner of the square and near the corner of the angle.

In testimony whereof I have hereunto set my hand.

GEO. F. WELLS.